United States Patent [19]

Cole

[11] Patent Number: 4,557,267
[45] Date of Patent: Dec. 10, 1985

[54] BRASSIERE AND METHOD OF MAKING SAME

[75] Inventor: Raymond C. Cole, Hillsdale, N.J.

[73] Assignee: International Playtex, Inc., Stamford, Conn.

[21] Appl. No.: 496,771

[22] Filed: May 20, 1983

[51] Int. Cl.⁴ .............................................. A41C 3/06
[52] U.S. Cl. .................................. 128/464; 128/505; 128/489
[58] Field of Search ............... 128/463, 464, 479, 505, 128/516, 489

[56] References Cited

U.S. PATENT DOCUMENTS

| | | | |
|---|---|---|---|
| 2,115,065 | 4/1938 | Dym. | |
| 2,454,535 | 11/1948 | Warner. | |
| 2,696,005 | 12/1954 | Schaumer. | |
| 2,715,733 | 8/1955 | Dubner | 128/479 |
| 3,021,844 | 2/1962 | Flagg et al. | 128/463 |
| 3,799,174 | 3/1974 | Howard | 128/464 |
| 4,372,321 | 2/1983 | Robinson | 128/463 |
| 4,419,997 | 12/1983 | Cole et al. | 128/464 |

FOREIGN PATENT DOCUMENTS

| | | |
|---|---|---|
| 18799 | 2/1972 | Australia. |
| 0073708 | 3/1983 | European Pat. Off.. |
| 1291762 | 3/1962 | France. |
| 2487734 | 5/1982 | France. |

*Primary Examiner*—Doris L. Troutman
*Attorney, Agent, or Firm*—Stewart J. Fried; Charles N. J. Ruggiero

[57] ABSTRACT

A molded brassiere formed of a thin fabric includes a nipple patch or cover smoothly adhered to an apex portion of each breast cup to impart a pleasing and modest appearance. The nipple patch is sized, shaped and of an opacity to comfortably cover the nipples and surrounding areola. Further, the nipple patch is sufficiently rigid to depress the nipples, which might otherwise protrude through the thin cup fabric and, thereby, provide a smooth contour along the natural arc line of the bust.

The method of making the breast cup of the brassiere is easily and simply accomplished by juxaposedly positioning a coated patch fabric onto a central portion of the flat cup fabric and simultaneously adhering and molding the fabrics at preselected temperatures to form an unitary, three dimensional breast cup including the nipple patch.

10 Claims, 10 Drawing Figures

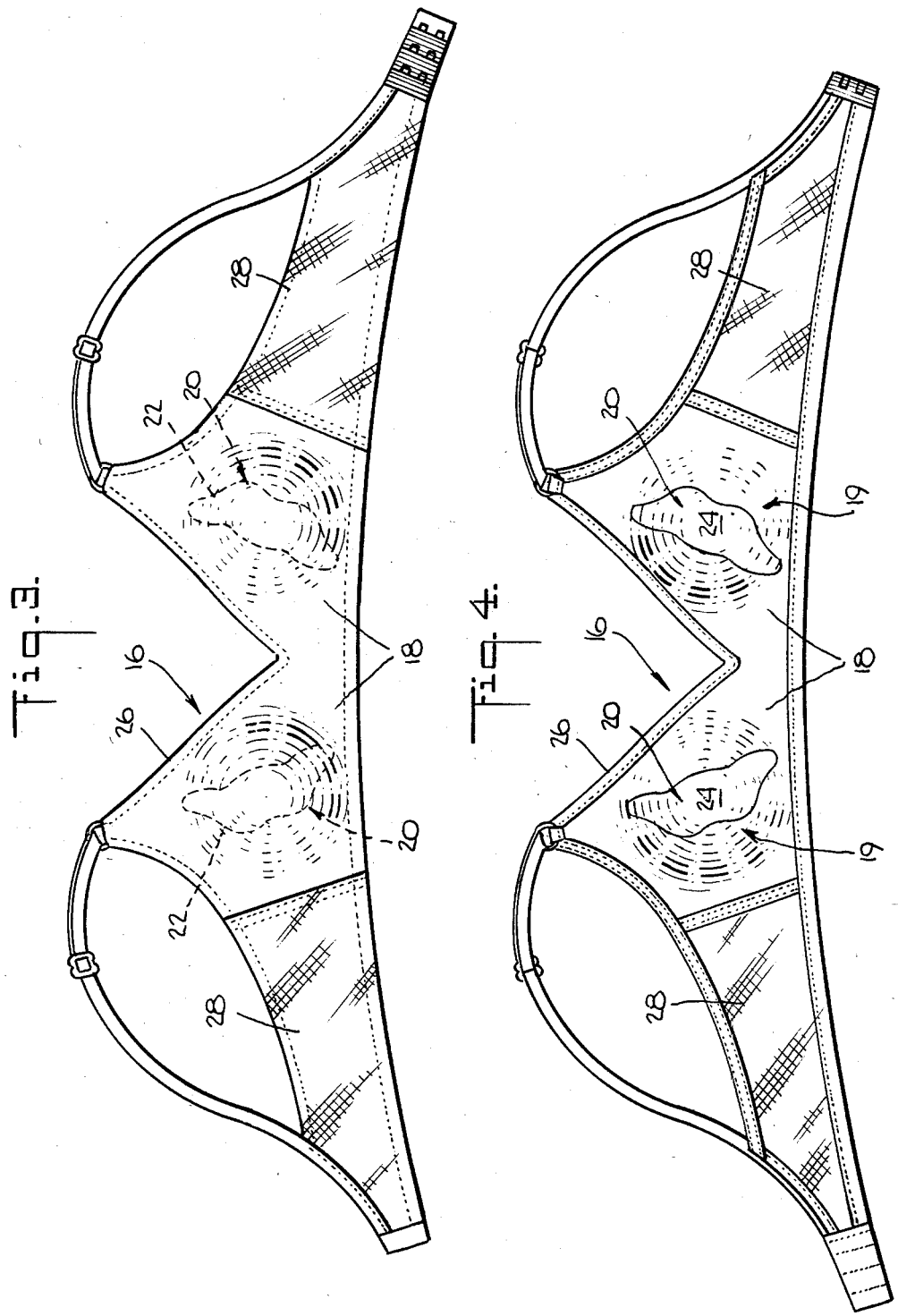

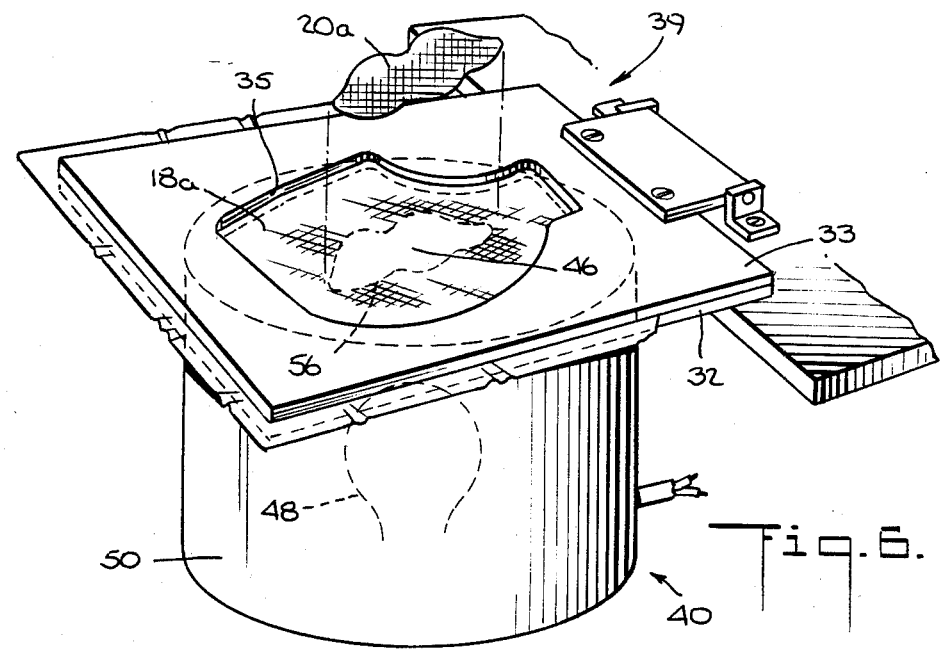
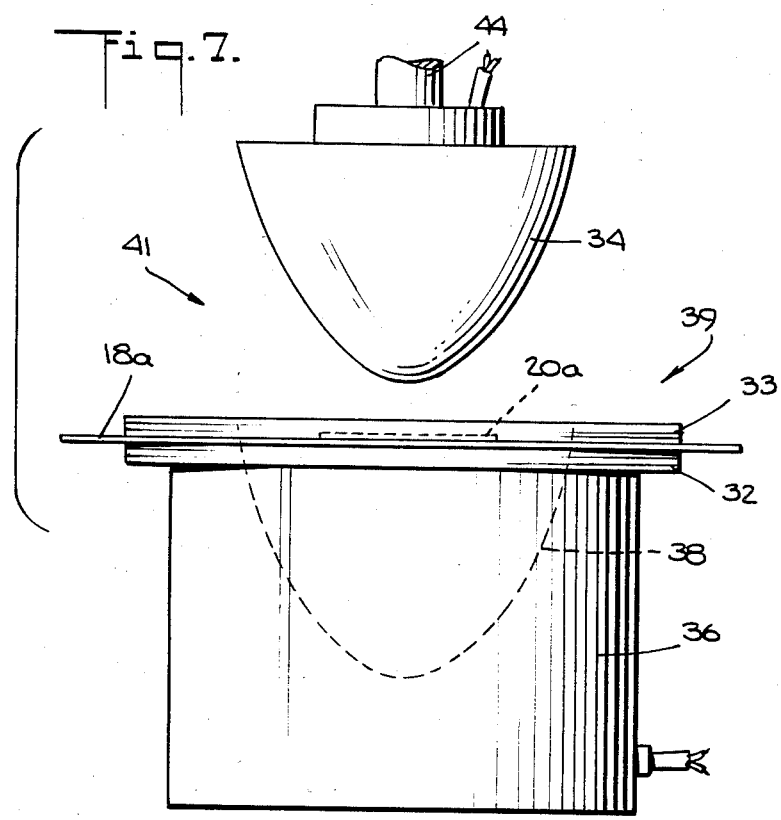

BRASSIERE AND METHOD OF MAKING SAME

BACKGROUND OF THE INVENTION

1. Field of the Invention

The invention relates to a brassiere and method of making the same and, in particular, a thin fabric brassiere with a nipple cover which conceals a woman's nipple and prevents nipple protrusion beyond the natural arc line of the bust.

2. Description of the Related Art

The modern brassiere is intended to provide shape, support and/or separation, while imparting a comfortable fit and pleasing appearance. The recent trend has been to provide a natural, less confining brassiere having a smooth contour which conforms to the breast. Thus, brassieres with molded, unlined cups made of thin fabrics have been preferred, and the cut and sewn cup with its visible and thickened central seam has been avoided.

Further, with today's fashion emphasis on the "natural look", more light weight and clingy clothes are worn. When such clothing are worn over either a cut and sewn brassiere or a molded brassiere, the outline of the brassiere may be visible. When the preferred thin, molded brassiere is worn, in particular, there is a tendency of the wearer's nipples to protrude and the nipples, including the areola surrounding the nipples, to show-through her brassiere as well as the wearer's outer clothing. For many women, this may not be desirable for modesty reasons.

Although this modesty problem may not be prevalent with cut and sewn cups because the seam of the cups may cover the nipple and/or limit nipple protrusion, women prefer molded, unlined cups, which impart a smooth, natural look. Accordingly, nipple protrusion and show-through presents a considerable problem.

Some attempts have been made to solve this problem with a spot bandage-like nipple cover. For example, U.S. Pat. No. 4,333,471, issued June 8, 1982, discloses a disc-shaped nipple cover which is intended to be adhesively secured around the surrounding skin of the nipple of the user. A new cover must be put on every time a woman gets dressed. Thus, this concept is terribly inconvenient. Further, this cover only functions as a shield and does not depress the nipple, thereby preventing nipple protrusion.

Prior art references have inherently avoided the above-mentioned problem of nipple show-through or protrusion by resorting to full cup linings of fiberfill or the like. For example, brassieres having pads at or around the nipple area which improve the fit and support of the brassiere cups are shown in U.S. Pat. No. 2,594,549, issued Apr. 29, 1952, U.S. Pat. No. 2,567,732, issued Sept. 11, 1951, U.S. Pat. No. 2,440,466, issued Apr. 27, 1948, and U.S. Pat. No. 2,420,472, issued May 13, 1947. Such brassieres do not generally satisfy the marketing demands for lighter, softer, more naturally contoured brassieres, and even with a thicker fiberfill or padded cup, the brassiere may cover, but not depress the nipple. Further, such added bulk is a definite consumer disadvantage.

Additionally, nursing or maternity bras having pockets for holding generally bulky, absorbent pads inherently prevent show-through and nipple protrusion. Examples of such nursing brassieres are shown in U.S. Pat. No. 2,047,522, issued July 14, 1936, U.S. Pat. No. 2,522,010, issued Sept. 12, 1950, U.S. Pat. No. 2,925,816, issued Feb. 23, 1960, and U.S. Pat. No. 3,513,852, issued May 26, 1970.

The problems with the above-mentioned brassieres, in general, is that they are either uncomfortable, bulky and padded while providing a smooth, but overly structured contour, or are thin, unlined and seamless and, thus, subject to unsightly nipple show-through and protrusion. To date, no brassiere satisfies the demand of the current market in providing a thin, light weight brassiere which imparts a natural look, yet is modest in appearance, particularly if the cup fabric is to be unlined and seamless.

It is well known in the prior art to form a multi-layered brassiere which inherently prevents nipple show-through and protrusion by laminating and heating a plurality of fabrics into a three dimensional shape, as exemplified by U.S. Pat. No. 2,304,989, U.S. Pat. No. 3,317,645 and U.S. Pat. No. 3,320,346, to mention but a few. Additionally, means have been devised for incorporating undercup support panels for a brassiere cup as illustrated in U.S. Pat. No. 4,172,002, issued Oct. 23, 1979. In accordance with the disclosure of this patent, a support panel is adhered to a brassiere cup fabric in a two step process wherein one temperature is used to adhere the panel to the fabric and, thereafter, the cup and panel are molded into a three dimensional shape at a relatively higher temperature. Such a two step process is costly, yet believed to be necessary to avoid movement and wrinkling of the support panel relative to the cup fabric. This disclosure does not address the problems of positioning, bonding or molding of other than a support panel which provides shape and support to a cup and covers only the lower peripheral portion of the cup, and its method is believed to be inappropriate for securing an apex cover patch to the molded cup fabric.

Other prior art techniques form composite cups with support panels by molding a support patch and cup separately and joining the two by sewing. This is undesirable because of its expense, and the patch and cup cannot always be matched and wrinkles and creases may be produced.

Thus, it is desirable to make a molded breast cup which conceals and depresses the nipples of a wearer in a simplified manner to overcome the above-mentioned disadvantages and problems.

SUMMARY OF THE INVENTION

In accordance with the present invention, a brassiere includes two thin, preferably single ply, fabric breast cups each having a nipple cover adhered to an apex portion of the cup. The cover is sized and shaped to encompass the nipples including the areola surrounding the nipples of a wearer, and in combination with the cup fabric, have sufficient opacity to conceal or mask the same. It is preferable, for comfort purposes, that the cover be relatively thin, have a smooth surface exposed directly to the wearer's nipples and smoothly conform to the three dimensional shape of the cup. An adhesive utilized to adhere the cover to each cup imparts a rigidity to each nipple cover to inwardly depress the wearer's nipples when the brassiere is in use. Thus, the brassiere is adapted to impart a modest appearance and a smooth contour along the natural arc line of the bust as a result of the nipple cover inwardly depressing and concealing the wearer's nipples.

The method of making the breast cups of the brassiere includes the steps of loosely positioning a nipple cover fabric onto a central portion of a moldable cup fabric and, thereafter, at selected molding temperatures, bonding said fabrics together and simultaneously molding the fabrics into conforming three dimensional shapes. Prior to positioning, the nipple cover fabric is coated with a thermoplastic adhesive, and is of a size and shape to substantially cover the apex portion of the resultant molded cup and prevent pleating during the molding step. The positioning step preferably includes the steps of illuminating an outline of the configuration of the nipple cover fabric onto a central portion of the thin, translucent cup fabric, and, thereafter, aligning the nipple cover fabric with the outline on the central portion of the cup fabric. The nipple cover and cup fabric are then placed between a heated male mold and a heated female mold, where upon activation of the heated molds, the coated nipple cover fabric is simultaneously bonded and molded to form the resultant three dimensional unitary cup with the smoothly conforming nipple cover at the apex portion thereof.

BRIEF DESCRIPTION OF THE DRAWINGS

The invention will now be described with reference to the accompanying drawings in which:

FIG. 3 is a front plan view of the brassiere shown in FIG. 2;

FIG. 4 is the back plan view of the brassiere shown in FIG. 3;

FIG. 6 is a elevational view, schematically shown, of the apparatus, shown in FIG. 5, in use in accordance with this invention;

FIG. 7 is a front elevational view, schematically shown, of the support plate assembly in position relative to the molding members;

DESCRIPTION OF THE PREFERRED EMBODIMENTS

Figure 2:
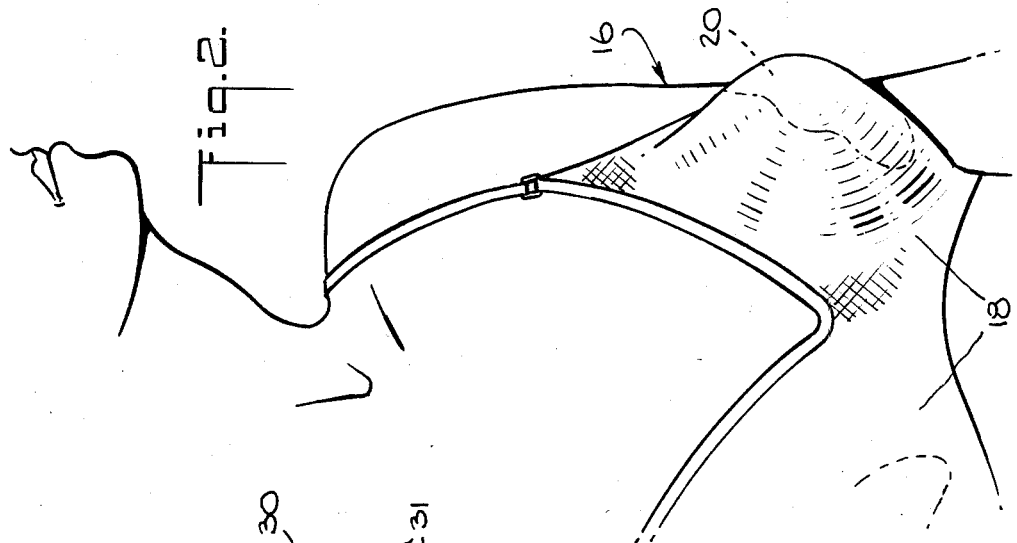
FIG. 2 is a perspective view, partially broken away, of a unlined brassiere in accordance with the principle of this invention, as worn by a user.
Figure 1:
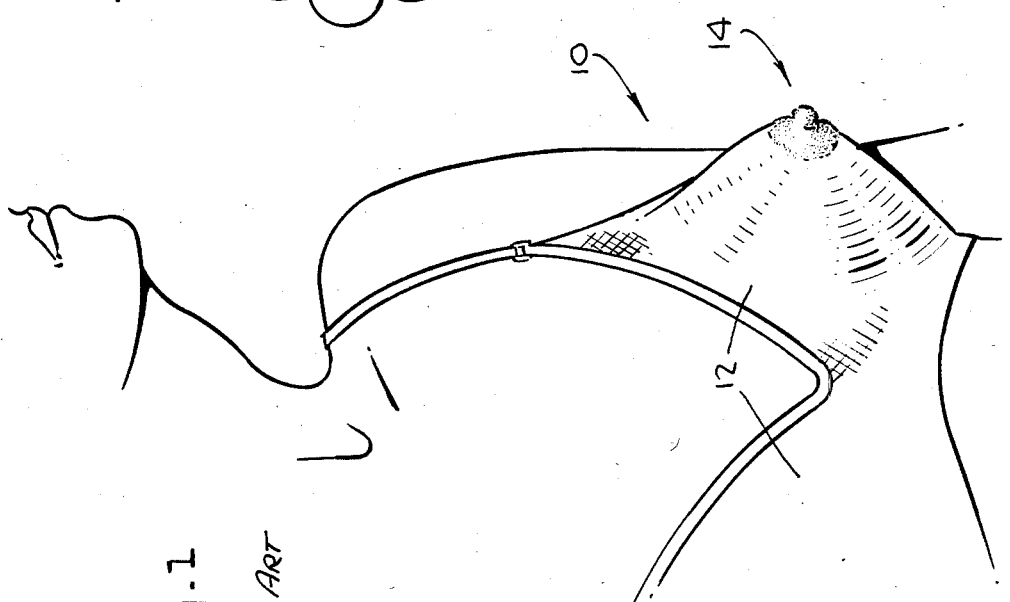
FIG. 1 is a perspective view, partially broken away, of a prior art unlined brassiere worn by a user.

Referring to FIG. 1, a prior art unlined brassiere 10 as worn by a user is shown. The brassiere 10 includes two cups 12 which are uniformly thin and formed of a single thickness of fabric, enabling nipple show-through and protrusion in the nipple portion 14 thereof. In contrast, FIG. 2 shows a brassiere 16 in accordance with this invention as worn by a wearer. The brassiere 16 has two breast cups 18 including a nipple cover or patch 20 which covers and depresses the nipples of the wearer to effect a modest appearance and a smooth contour along the natural arc line of the wearer's breast.

As best illustrated in FIG. 3 and 4, the brassiere 16 has two substantially thin breast cups 18, a frame 26 encompassing the cups 18, and side panels 28 which interconnect the frame 26 and cups 18 from both sides thereof. The breast cups 18 are typically unlined, thin, translucent and made of a single layer of polyester tricot fabric.

In accordance with this invention, the nipple cover or patch 20 is secured to an apex portion 19 of the breast cups 18 and conforms with the three dimensional shape thereof. The patch 20 has an outer exposed side 22 which interfaces with the wearer's nipples when the brassiere 16 is worn and an inner side 24 which interfaces with the cup 18. The outer exposed side 22 preferably has a smooth surface.

The patch 20 is typically thin-gauged for comfort, preferably 0.012"–0.014", and made of non-stretchable material such as cotton, tricot, polyester or simplex. If desired, the patch 20 can be made out of the same material as the cup 18.

The patch material has an opacity by itself or in combination with the cup material to prevent nipple see-through. However, it is preferable that the patch material does not create a stark contrast to the breast cup 18. Thus, the patch 20 is not detected when sheer clothing is worn over the brassiere 16.

Figure 10:
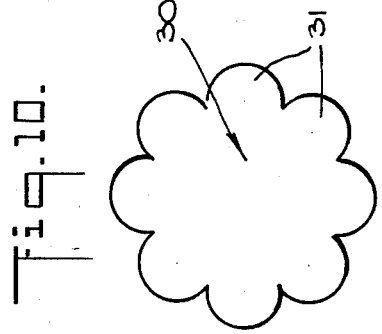
FIG. 10 is a plan view of an alternative embodiment of a nipple cover in accordance with the invention.

The patch 20 is restrictively sized and shaped to smoothly cover the apex portion 19 of the cup 18 and, thus, conceal or mask the nipples, including the areola surrounding the nipples, of a wearer of the brassiere 16. The patch 20 is preferably symmetrical, at least to the extent that a one-half portion of the patch 20 is a mirror image of the other one-half portion, to ensure that the patch 20 does not pleat or wrinkle during the manufacturing process of the brassiere 16, discussed herein. Further, it is preferable to design the patch 20 to be aesthetically pleasing and, accordingly, it may be desirable to have the patch 20 extend beyond the apex portion 19. A patch 30 in FIG. 10 shows an alternative patch configuration which meets the above-mentioned requirements; i.e. the patch 30 with eight symmetrically positioned petals 31 provides sufficient nipple coverage, resists pleating and is aesthetically pleasing.

The patch 20 is sufficiently rigid relative to the cup fabric enabling the patch 20 to inwardly depress the nipples of the wearer upon contact therewith. This is accomplished by using a relatively rigid patch fabric and/or utilizing an adhesive which imparts rigidity thereto, as discussed herein.

Although the patch 20 may be sewn to the apex portion 19 of the cup 18, the patch 20 is preferably adhered to the apex portion 19 of each breast cup 18 with an adhesive coating applied on the inner side 24 of the patch 20. The adhesive is coated on the inner side surface 24 of the patch 20 prior to molding the patch 20 and the breast cups 18, and imparts some rigidity to the patch 20 upon activation during the molding of the patch 20 and the breast cup 18, as discussed herein. This stiffness or rigidity quality imparted by the adhesive to the patch 20 tends to depress the nipple, yet maintain a smooth, natural contour. A thermoplastic, hot melt adhesive, such as a polyamide or polyester adhesive which are activated by normal molding temperatures, is preferably used.

Thus, the nipple patch or cover 20 is sized, shaped, positioned and made of material such that the nipples, including the surrounding areola, of a wearer are amply and comfortably covered and concealed. The patch 20 does not pose a sharp contrast with the cups 18 or with clingy, thin clothing worn thereover as a result of the selected opacity of the patch 20 and cup 18. Further, the rigidity imparted on the patch 20 is sufficient to depress the nipple, thereby preventing nipple protrusion beyond the natural arc line of the breasts of a wearer. Accordingly, the patch 20 comfortably prevents nipple showthrough and protrusion in a thin brassiere 16, enabling a soft, natural, but modest appearance.

The breast cups 18 of the brassiere 16 are simply and easily made with modified conventional molding equipment, by loosely placing a coated nipple patch fabric 20a onto a central portion 46 of a translucent breast cup fabric 18a and, thereafter, while the fabrics 20a and 18a are both flatly positioned, simultaneously adhering and molding a patch fabric 20a to a cup fabric 18a to form the three dimensional cup 18. The resultant patch 20 smoothly conforms with the three dimensional shape of the cup 18 and is affixed to the apex portion 19 of the cup 18.

Figure 8:
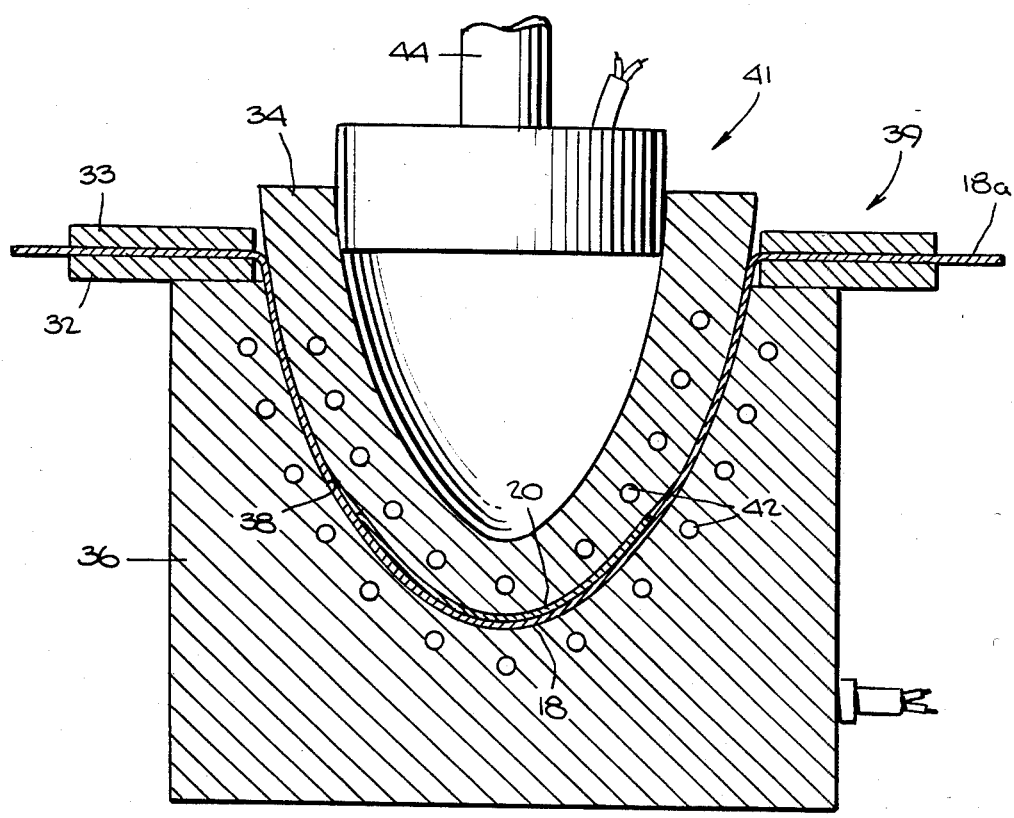
FIG. 8 is front sectional view, schematically shown, of the molding members in the closed position.

As best seen in FIGS. 5–8, molding apparatus 41 is used in conjunction with holding apparatus 39 and positioning and alignment apparatus 40 to form the cups 18 in accordance with the invention. FIG. 7 shows the molding apparatus 41 well known in the art, as in U.S. Pat. No. 3,880,561, issued Apr. 29, 1975, which is utilized as discussed herein and comprises a top or male molding member 34 having a three-dimensional shape of the cup 18 and a complementary bottom or female molding member 36 which is adapted to receive the male member 34 and cup fabric 18a therebetween. As best seen in FIG. 8, the molding members 34 and 36 are provided with conventional means 42 for the heating thereof to preselected temperatures and further conventional means 44 for lowering and inserting the male molding member 34 within an opening 38 of the female molding member 36.

Figure 9:
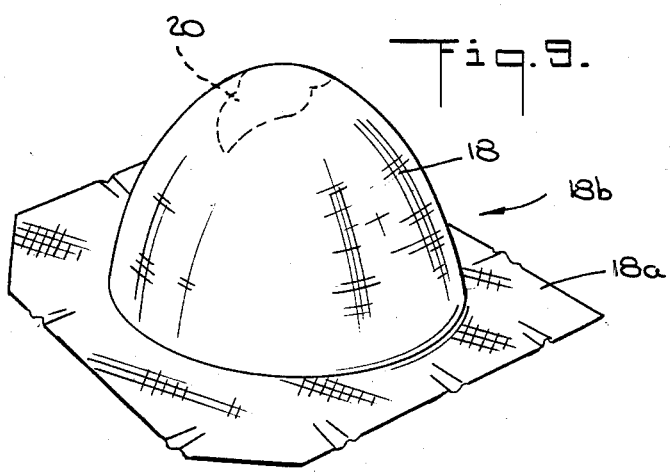
FIG. 9 is a perspective view of a finished molded cup in accordance with this invention.

The holding apparatus 39 includes a pair of plates 32 and 33 preferably associated with the female mold member 36 which provide, in effect, a table to hold, support and clamp the cup fabric 18a and nipple cover 20a during the positioning of the cover 20a relative to the cup fabric 18a and prior to molding of the brassiere cup 18. The plates 32 and 33 are movable enabling the plates 32 and 33 to travel between molding and positioning steps in accordance with the invention. The plates 32 and 33 may be attached to any of the conventional molding apparatus 41 described above or positioning and alignment apparatus 40 described in detail herein as long as the plates 32 and 33 are movable therebetween. Both plates 32 and 33 have identical openings 35 which correspond to the desired bottom cross-sectional shape of a resultant molded cup 18b (FIG. 9). The bottom plate 32 is fixed horizontally to support and hold the cup fabric 18a prior to molding. The top plate 33 is preferably hinged to the bottom plate 32 enabling the top plate 33 to swing to an open position (FIG. 5) or a closed, clamped position (FIG. 6).

Figure 5:
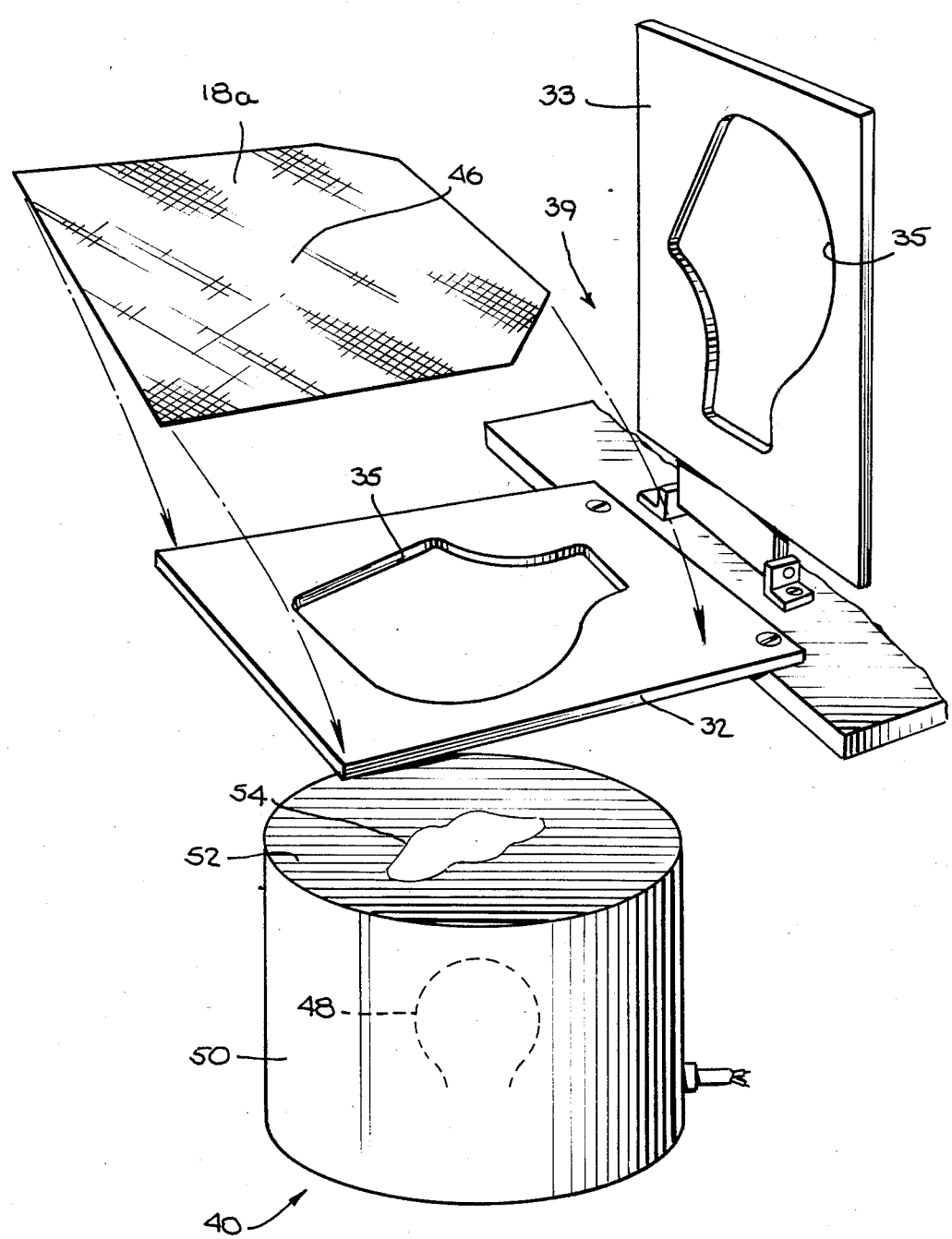
FIG. 5 is a exploded elevational view, schematically shown, of the illuminating and alignment apparatus prior to use in accordance with this invention.

The positioning and alignment apparatus 40, as depicted in FIGS. 5 and 6, enables the patch fabric 20a to be accurately positioned and aligned at the central portion 46 of the breast cup fabric 18a prior to molding. This is accomplished when the cup fabric 18a is flatly placed on the support plate 32 over the positioning apparatus 40 which includes a shadowbox 50 having a top template 52 with an aperture 54 configured identically to the patch 20a. Within the shadowbox 50 and below the template 52, is an illuminating source 48 which is positioned relative to the template 52 to enable a nipple patch outline or shadow 56 (FIG. 6) to be illuminated and visible on the breast cup fabric 18a when the fabric 18a is placed over the shadowbox 50 prior to molding. The resultant outline 56 corresponds in shape to the aperture 54 and the patch 20a. It should be appreciated that the outline 56 can be alternatively projected onto the cup fabric 18a by suspending a template or opaque region configured identical to the patch 20a between the illuminating source 48 and the support plate 32.

Prior to positioning the patch fabric 20a onto the cup fabric 18a and prior to molding the two fabrics 20a and 18a to form the cup 18, the patch material is cut and formed. It has been found that in order for the resultant patch 20 of the cup 18 to modestly cover the nipples of a wearer yet maintain the natural appearance and light weight comfort of the brassiere 16, the patch fabric 20a is restrictively sized and shaped, as discussed above. The patch material must be cut in such a shape so as to avoid pleating or wrinkling when molding the patch fabric 20a and cup fabric 18a into a three dimensional shape. A multitude of patch configurations can fit these requirements and typically are selected based upon aesthetics thereof and/or the design of the particular brassiere which incorporates the same. Once a desired size and shape is chosen, the patch material is cut out, e.g. die cut.

It is preferable, prior to cutting, to have a heat sensitive adhesive coating applied to the patch material enabling the patch 20a to be adhered to the cup fabric 18a during the molding step described herein. Since the adhesive is activated, and not degraded, by normal molding temperatures, the patch 20a is adhered and molded simultaneously to the cup 18a to form a three dimensional shape during the molding step. Upon activation during molding, the adhesive imparts some rigidity to the patch 20, as discussed above.

After coating and cutting the patch 20a and prior to molding, the cup fabric 18a is flatly placed on the top of the bottom plate 32 which is positioned over the shadowbox 50, as seen in FIGS. 5 and 6. Initially, the upper plate 33 is pivoted open. Once the cup fabric 18a is placed on top of the lower plate 32, the upper plate 33 is closed over the cup fabric 18a so that the cup fabric 18a lays flatly between the plates 32 and 33 over the opening 35. The illuminating source 48 illuminates the outline 56, identically configured to that of the patch 20a, onto the central portion 46 of the cup fabric 18a. The adhesive coated patch 20a is then juxaposedly aligned with the illuminated outline 56 and held in place by gravity.

It should be understood that the cup fabric 18a is made of a translucent material to enable illumination of the outline 56 thereon. Further, the placement location of the patch 20a on the cup fabric 18a must ensure that the resultant patch 20 will be positioned at the apex portion 19 of the cup 18 upon molding thereof.

After juxaposedly positioning the fabrics 20a and 18a on the plates 32 and 33 over the shadowbox 50, the plates 32 and 33 holding the fabrics 20a and 18a are moved from a positioning station over the shadowbox 50 to a molding station between the molding members 34 and 36 and, specifically, adjacent the top of the female mold 36. As suggested above, various means utilizing the positioning apparatus 40 or the molding apparatus 41 may be provided to move the plates 32 and 33 between the positioning and molding stations. Further, a separate movable structure attachable or integral with the plates 32 and 33, such as a movable table with rollers, for example, may be used to move the plates 32 and 33 from the positioning apparatus 40 to the molding apparatus 41.

Next, the molding members 34 and 36 are heated to preselected temperatures for the impending molding process. The temperature of the male mold 34 and the length of time during which the patch 20a is initially contacted by the male mold 34 until the male and female molds 34 and 36 are in full contact with each other, are selected so as to only partially activate the adhesive. The length of time of initial contact between the male mold 34 and the patch 20a until the male mold 34 is fully inserted into the female mold 36 is selected also based upon the desire to limit pleating of the patch 20a during the molding step, further discussed herein. The female mold 36, on the other hand, is set at a temperature hotter than the male mold 34 so as to fully activate the adhesive when the fabrics 20a and 18a are in full contact with the mold members 34 and 36, and so as to be sufficiently hot to properly mold the fabrics 20a and 18a into the desired three dimensional shape. Since there is relative movement of the patch 20a and the cup fabric 18a (of up to 1 cm) during the molding process, these temperature parameters prevent the adhesive from showing beyond the final area of securement between the patch 20 and the cup 18 and, thereby, avoids the unsightly appearance of an adhesive border on the cup 18 surrounding the patch 20.

These temperatures will vary depending on the selected hot melt adhesive and patch material and the time it takes the male mold 34 to become fully inserted into the female mold 36 after initial contact with the patch 20a. When a polyamide heat sensitive adhesive is coated on a polyester tricot patch, for example, the male mold 34 may be heated to about 350° F. and from the time the male mold 34 makes initial contact with the patch 20a and the cup fabric 18a until the male mold 34 is fully inserted into the female mold 36 is typically about 4 seconds. The complementary female mold 36 is set at about 415° F.

Once the mold members 34 and 36 are properly heated, the male mold 34 is lowered in a single, continuous, downward motion to contact the patch 20a, as schematically shown in FIGS. 7 and 8. As the male mold 34 advances downwardly, but prior to contacting the patch fabric 20a, a retractable conventional clamp bar (not shown) moves, likewise, downwardly to securely clamp the plates 32 and 33 with the flatly placed fabrics 20a and 18a therebetween in a stationary position. From the time the male mold 34 makes initial contact with the patch 20a and cup fabric 18a until the male mold 34 is fully inserted into the female mold 36 may typically take about 2-4 seconds. The timing of this segment of the molding sequence is dictated by the desire to prevent the adhesive from showing beyond the final area of securement between the patch 20 and the cup 18, discussed above, and the desire to avoid pleating of the patch 18. Accordingly, the male mold 34 must move both slowly and continuously. As the male mold 34 continues downward without interruption into the opening 38, the patch and cup fabrics 20a and 18a form an integrally molded cup 18 with the nipple patch 20 adhered to the apex portion 19 and the nipple patch 20 conforming to the three dimensional shape of the cup 18. The fabrics 20a and 18a are molded in full contact between the molding members 34 and 36 for about 30 seconds. Thereafter, the male mold 34 and clamping means (not shown) are moved upwardly enabling the resultant cup 18b (FIG. 9) to be removed from the female mold 36.

It should be understood that the mold temperatures and the timing of the molding step may vary depending on the type of materials and adhesive used. However, the timing and temperature parameters set forth above have been found to be preferable when polyester tricot is used for both the cup and patch fabric 18a and 20a and a polyamide or polyester adhesive is used.

Following the removal of the molded cup 18b, as depicted in FIG. 9, it is suitably cut for assembly of a conventional brassiere with nipple covering and depressing means by sewing, for example, the cup 18 into a frame 26 having body-encompassing panels 28. It should be understood that the left and right cups 18 can be molded simultaneously and are in mirror symmetrical relation.

Accordingly, the positioning and aligning step prior to molding properly places the patch 20a on the central portion 46 of the cup fabric 18a to ensure the resultant nipple patch 20 covers the apex portion 19 of the cup 18. Further, the single bonding-molding step, as described above, enables the heat sensitive adhesive to be substantially limited to that area of securement between the patch 20 and the cup 18. Thus, the patch 20 is rigidified from the adhesive, yet the cup 18 itself has no unsightly adhesive resulting from fabric movement during molding. Accordingly, the adhesive oozing problems which result from two step bonding-molding processes of the prior art are alleviated. Lastly, since the bonding-molding process of the invention takes place in one continuous step as oppose to two separate bonding and molding steps, pleating of the patch 20 is avoided, the resultant patch 20 smoothly conforming to the three-dimensional shape of the cup 18.

In summary, the brassiere 16 is provided with means to cover and depress a woman's nipples, thereby preventing nipple show-through and protrusion. The nipple patch or cover 20 of the brassiere 16 is rigid enough to depress the nipple, yet so constructed to be comfortably worn. The patch 20 is sized and shaped to cover the nipple including the surrounding areola, yet is fabricated so as not to starkly contrast with the cup 18 or one's outer clothing. Thus, the thin, unlined brassiere 16 provides a smooth contour along the arc line of the bust imparting a natural, yet modest appearance. Further, the brassiere 16 is easily made by simply positioning the coated patch 20a on the central portion 46 of the cup fabric 18a with illuminating and alignment apparatus 40, and, thereafter, simultaneously bonding and molding the fabrics 20a and 18a in a single, continuous step with conventional molding equipment 41, to form the molded cup 18 with the smoothly conforming, rigid patch 20.

The foregoing specification and drawings are merely illustrative of the invention and are not intended to limit the invention to the disclosed embodiment. Variations and changes which are obvious to one skilled in the art are intended to be within the scope and nature of the invention which is defined in the appended claims. For example, it should be appreciated that the invention disclosed herein is not only applicable to brassieres, but also to any apparel, such as swimwear for example, that may incorporate a molded breast cup. Further, although the patch 20 of the cup 18 is preferably disposed as depicted, on the inner, breast receiving side of the cup 18, it should be understood that it is within the scope of this invention to adhere a nipple patch 20 on the outer side of the cup 18 and still cover and depress a wearer's nipples.

The embodiment of an invention in which an exclusive property or privilege is claimed are defined as follows:

1. A breast cup formed of relatively thin fabric, said cup comprising:
   covering means secured to said cup for providing supplemental covering confined to essentially only the apex portion of said cup;
   and means for rigidifying said covering means,
   whereby said covering means is adapted to conceal and depress a wearer's nipple to prevent nipple see-through and protrusion through said cup.

2. The breast cup according to claim 1, wherein said covering means comprises a patch covering said apex portion of said cup and smoothly conforming to the three dimensional shape of said cup, said patch and fabric of said breast cup in combination having sufficient opacity to conceal said wearer's nipple.

3. The breast cup according to claim 2, wherein said patch covers only said apex portion of said cup.

4. The breast cup according to claim 1, wherein said rigidifying means comprises adhesive means for securing said covering means to said apex portion, said adhesive means being applied to a side of said patch which interfaces with fabric of said breast cup and imparting sufficient rigidity to said patch to prevent nipple protrusion.

5. A brassiere having two relatively thin fabric breast cups, means for connecting said breast cups to each other and means for fastening said breast cups around a woman's body; each of said breast cups comprising:
   covering means secured to the fabric of said breast cup for providing a supplemental covering confined to essentially only the apex portion of said breast; and
   means for rigidifying said covering means,
   whereby said covering means is adapted to conceal and depress a wearer's nipple to prevent nipple see-through and protrusion though said cup.

6. The brassiere according to claim 5, wherein said covering means comprises a patch covering said apex portion of each cup and smoothly conforming to the three dimensional shape of said cup, said patch and breast cup in combination having sufficient opacity to conceal said wearer's nipple.

7. The brassiere according to claim 6, wherein said patch and cup fabric are both made of a polyester tricot material.

8. The brassiere according the claim 6, wherein said patch is fabric having a thickness in the order of 0.012–0.014 inches.

9. A brassiere according to claim 5, wherein said rigidifying means comprises adhesive means for securing said covering means to said apex portion, said adhesive means being applied to a side of said patch which interfaces with said breast cup fabric and imparting sufficient rigidity to said patch to prevent nipple protrusion.

10. The brassiere according to claim 9, wherein said adhesive means is a hot melt adhesive.

* * * * *